United States Patent
Lee

(10) Patent No.: US 9,562,313 B2
(45) Date of Patent: Feb. 7, 2017

(54) LINK LEVER THAT ASSISTS OPERATION OF A CLUTCH ASSEMBLY

(71) Applicant: Dongbu Daewoo Electronics Corporation, Seoul (KR)

(72) Inventor: Jae Woo Lee, Incheon (KR)

(73) Assignee: DONGBU DAEWOO ELECTRONICS CORPORATION, Seoul (KR)

( * ) Notice: Subject to any disclaimer, the term of this patent is extended or adjusted under 35 U.S.C. 154(b) by 293 days.

(21) Appl. No.: 14/102,354

(22) Filed: Dec. 10, 2013

(65) Prior Publication Data

US 2015/0128655 A1    May 14, 2015

(30) Foreign Application Priority Data

Nov. 14, 2013  (KR) .......................... 10-2013-0138145

(51) Int. Cl.
  *D06F 37/30* (2006.01)
  *F16D 23/12* (2006.01)
  *D06F 39/08* (2006.01)

(52) U.S. Cl.
  CPC ............... *D06F 37/30* (2013.01); *D06F 39/08* (2013.01); *F16D 23/12* (2013.01)

(58) Field of Classification Search
  CPC .......... D06F 37/30; D06F 39/08; F16D 23/12; F16D 21/00
  See application file for complete search history.

(56) References Cited

FOREIGN PATENT DOCUMENTS

| CZ | 9 904 049 | 11/1999 |
|----|-----------|---------|
| GB | 05552 | 0/1905 |
| GB | 104898 | 3/1917 |
| KR | 10-2012-0073569 | 7/2012 |

OTHER PUBLICATIONS

Korean Patent App. No. 1020100135373 machine translation.*
Korean Patent Abstracts, Publication No. 10-2012-0073569, Published Jul. 5, 2009 KIPO, Republic of Korea.

* cited by examiner

*Primary Examiner* — Michael Barr
*Assistant Examiner* — Rita Adhlakha

(57) ABSTRACT

A link lever configured to assist operation of a clutch assembly is disclosed. In particular, a link lever configured to assist operation of a clutch assembly in a washing machine and that applies force to securely engage and completely release a coupling of the clutch assembly when the coupling is moved by a clutch lever between different sets of teeth in the clutch assembly.

11 Claims, 5 Drawing Sheets

LINK LEVER THAT ASSISTS OPERATION OF A CLUTCH ASSEMBLY

CROSS-REFERENCE TO RELATED APPLICATION

This application is based on and claims priority to Korean Patent Application No. 10-2013-0138145, filed on Nov. 14, 2013, with the Korean Intellectual Property Office, the disclosure of which is incorporated herein in its entirety by reference.

TECHNICAL FIELD

Embodiments according to the present disclosure relate to a link lever that assists operation of a clutch assembly, and more particularly, to a link lever that assists operation of a clutch assembly by applying force to securely engage and completely release a coupling of the clutch assembly when a clutch lever moves the coupling between different sets of teeth in the clutch assembly.

BACKGROUND

In general, a totally automatic washing machine refers to a washing machine that can perform multiple operations including, but not limited to: supplying wash water, washing, rinsing, spin-drying, and draining water. These operations are automatically performed in a single apparatus. Laundry can be washed by wash water flowing past/through the laundry, the impact of wash water on the laundry, and the like.

Various types of totally automatic washing machines include, in general, a main body, a water storage tub, a washing tub, a pulsator or agitator, a pulsator or agitator shaft, a washing tub shaft, a clutch assembly, a motor, and other elements. In such washing machines, the pulsator or agitator is connected to the pulsator or agitator shaft, and the washing tub is connected to the washing tub shaft.

In Korean Patent Application Laid-Open No. 2012-73569, Korean Patent No. 10-1015241, a connection to the pulsator shaft and a connection to the washing tub shaft are selectively and intermittently operated through the clutch assembly.

Particularly, in contemporary washing machines, the clutch assembly and a drain valve are simultaneously and intermittently operated by the motor.

For example, as illustrated in FIGS. 1 and 2, one side (110 of FIG. 3) of a link lever 100 is connected to a drain valve (not illustrated) in a drain assembly 10 to intermittently drain wash water through an inlet 11, and the other side (120 of FIG. 3) of the link lever 100 is connected to a clutch lever 21 to finally and intermittently operate a clutch assembly.

In the clutch assembly, the clutch lever 21 is connected to a lift lever 22, and the lift lever 22 is connected to a coupling 23. Rotor teeth 24 are disposed at an upper portion of the coupling 23, and fixed base teeth 25 are disposed at a lower portion of the coupling 23.

The rotor teeth 24 are connected to a washing tub shaft 30, and the coupling 23 is connected to a pulsator shaft 40. The pulsator shaft 40 is rotatably coupled to a hollow portion (an opening) in the center of the set of rotor teeth 24.

As illustrated in FIG. 1, the drain valve is closed when the link lever 100 is pulled, e.g., during washing; and as illustrated in FIG. 2, the drain valve is opened when the link lever 100 is released (no longer pulled), e.g., during spin-drying. In an alternative implementation, the drain valve is opened when the link lever 100 is pulled (e.g., during spin-drying), and closed when the link lever is released (e.g., during washing).

As illustrated in FIG. 1, during washing, the coupling 23 is raised and engaged with the rotor teeth 24. As a result, because the lower portion of the pulsator shaft 40 is coupled to the coupling 23 like a spline, the washing tub shaft 30 and the pulsator shaft 40 rotate together.

In contrast, as illustrated in FIG. 2, during spin-drying, the coupling 23 is lowered, releasing the engagement between the coupling 23 and the rotor teeth 24. Instead, the coupling 23 is engaged with the base teeth 25 that are disposed at the lower portion of the coupling 23. As a result, only the washing tub shaft 30 rotates (the pulsator shaft 40 does not rotate together with the washing tub shaft 30).

However, the aforementioned washing operation and spin-drying operation are merely examples. In some types of washing machines, during washing, only the pulsator or agitator is rotated, only the washing tub is rotated, and/or the pulsator and the washing tub are simultaneously rotated.

During spin-drying, both the washing tub and the pulsator or agitator may be rotated. However, in some types of washing machines, during spin-drying, only the washing tub is rotated, and/or the pulsator or agitator is maintained in a free state so as to prevent laundry from being damaged due to a collision between the laundry and the pulsator or agitator.

As illustrated in the examples of FIGS. 1 and 2, when the link lever 100 is pulled, the coupling 23 is raised upward and can engage with the rotor teeth 24; and when the link lever 100 is released, the coupling 23 is lowered and the engagement between the coupling 23 and the rotor teeth 24 is released, allowing the coupling 23 to engage with the base teeth 25.

However, as illustrated in FIGS. 1 and 2, with reference also to FIG. 3, one side (portion 120) of the link lever 100 is securely coupled to the clutch lever 21. Therefore, there may be a problem when the coupling 23 is lowered because it may not separate completely from the rotor teeth 24 due to the force with which it is engaged with the rotor teeth 24 and/or because the link lever 100 is connected to the drain valve by a spring that may not be fully operational.

On the other hand, when the coupling 23 is raised, there may be a problem because it may not separate completely from the base teeth 25, because of the force with which it is engaged with the base teeth 25. This can be particularly problematic when the laundry presses up against the pulsator shaft 40 (that is, when the weight of the laundry is applied to the pulsator shaft 40).

The washing machine may not operate smoothly because of the aforementioned problems. Furthermore, if spin-drying starts before the coupling 23 moves from its position for washing (the raised position) to its position for spin-drying (the lowered position), then the coupling 23 may be engaged with the base teeth 25 by only the slight amount of force present when spin-drying starts.

Consequently, because the motor may be already rotating at a high speed when the coupling 23 and the base teeth 25 engage each other, the coupling 23 can be abraded or damaged from impacting the base teeth. A similar problem can occur when the coupling 23 is moved from its position for spin-drying to its position for washing.

SUMMARY

Embodiments according to the present disclosure provide a link lever that assists operation of a clutch assembly, functions as a connection tool, and applies a force that securely engages and completely releases a coupling of the clutch assembly when the coupling is moved between different sets of teeth by a clutch lever.

One or more exemplary embodiments according to the present disclosure provide a link lever configured to assist operation of a clutch assembly, in which the link level includes (i) a drain valve connection portion which is connected to a drain assembly, and (ii) a clutch lever connection portion which is connected to a clutch lever of the clutch assembly. In one or more such embodiments, the clutch lever connection portion includes: a first (e.g., outer) catching portion at one side of the clutch lever connection portion, (ii) a second (e.g., inner) catching portion which is between the first catching portion and the drain valve connection portion, and (iii) a link connection portion that connects the first catching portion and the second catching portion to each other. In such embodiments, the inner catching portion pushes the clutch lever when the clutch lever is moved outward (away from the drain assembly), and the outer catching portion pushes the clutch lever when the clutch lever is moved inward (toward the drain assembly).

In one or more of these embodiments, the first/outer catching portion and the second/inner catching portion may have a vertical frame shape, and the link connection portion may have a horizontal frame shape (e.g., the link connection portion may be at substantial right angles to the first/outer catching portion and the second/inner catching portion, and the first/outer catching portion and the second/inner catching portion may be substantially parallel with each other).

In one or more of these embodiments, the clutch lever connection portion, including the outer catching portion, the inner catching portion, and the link connection portion, have a hook-like shape.

In one or more other embodiments, the clutch lever connection portion includes a second outer catching portion and a second link connection portion that connects the second outer catching portion to the inner catching portion. Thus, in one or more embodiments, a pair of outer catching portions are provided.

According to one or more exemplary embodiments according to the present disclosure, when the coupling of the clutch assembly is moved by the clutch lever between different sets of teeth of the clutch assembly, a slight amount of force (impact) is applied to the clutch lever that is connected to the coupling. Therefore, the link lever functions as a connection between the clutch lever, the drain assembly, and the coupling in the clutch assembly, and the coupling is securely engaged and completely released when it is moved between the different sets of teeth.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, a link lever that assists operation of a clutch assembly according to one or more exemplary embodiments of the present disclosure will be described in detail with reference to the accompanying drawings.

Figure 1:
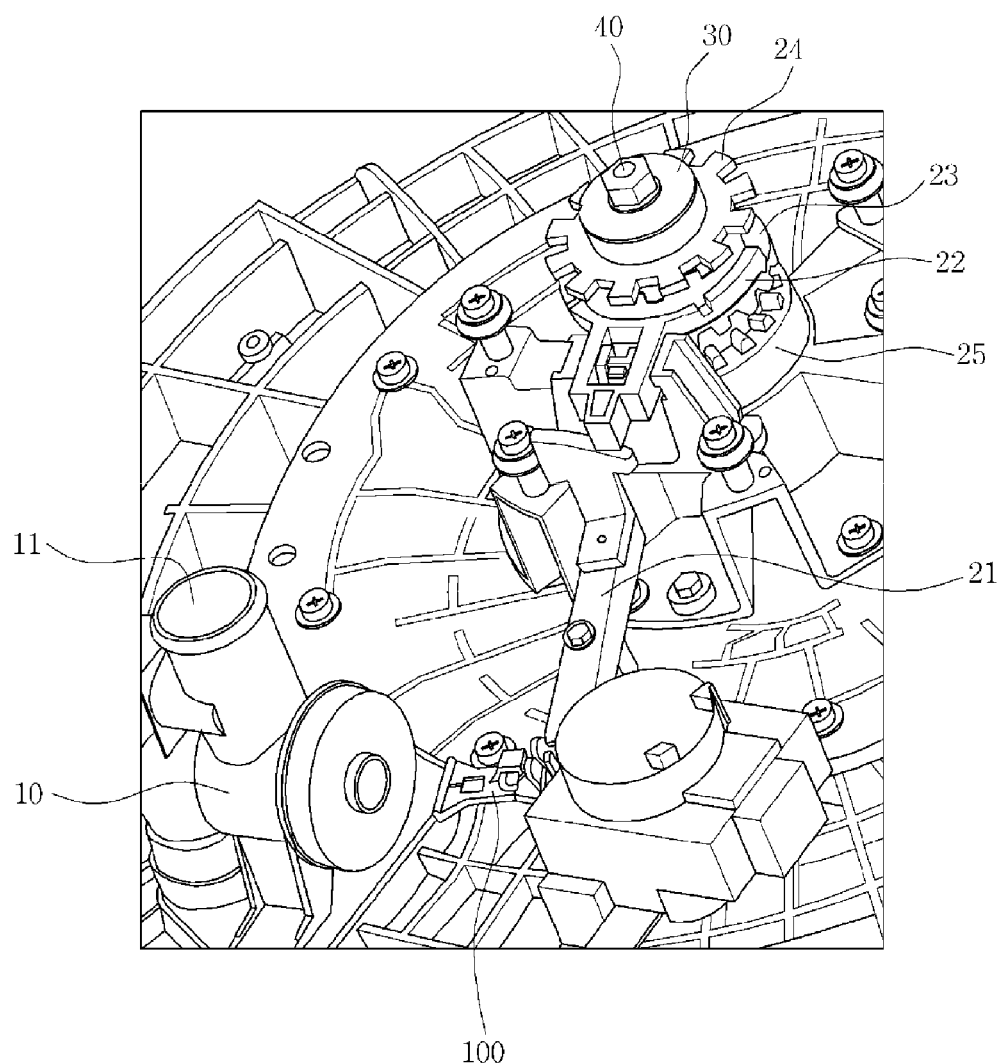
FIG. 1 is a first partial state view illustrating a clutch assembly having a link lever according to the related art.
Figure 2:
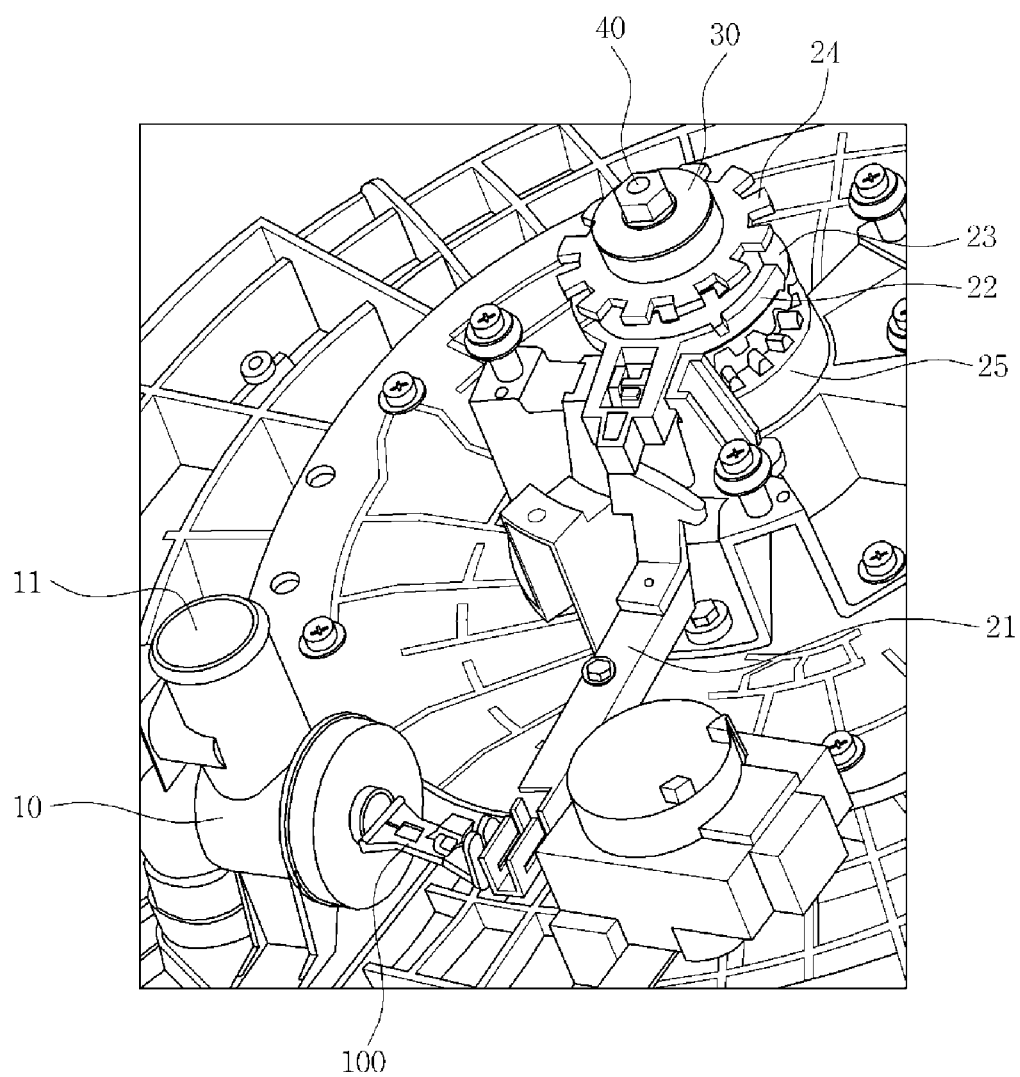
FIG. 2 is a second partial state view illustrating the clutch assembly having the link lever according to the related art.
Figure 3:
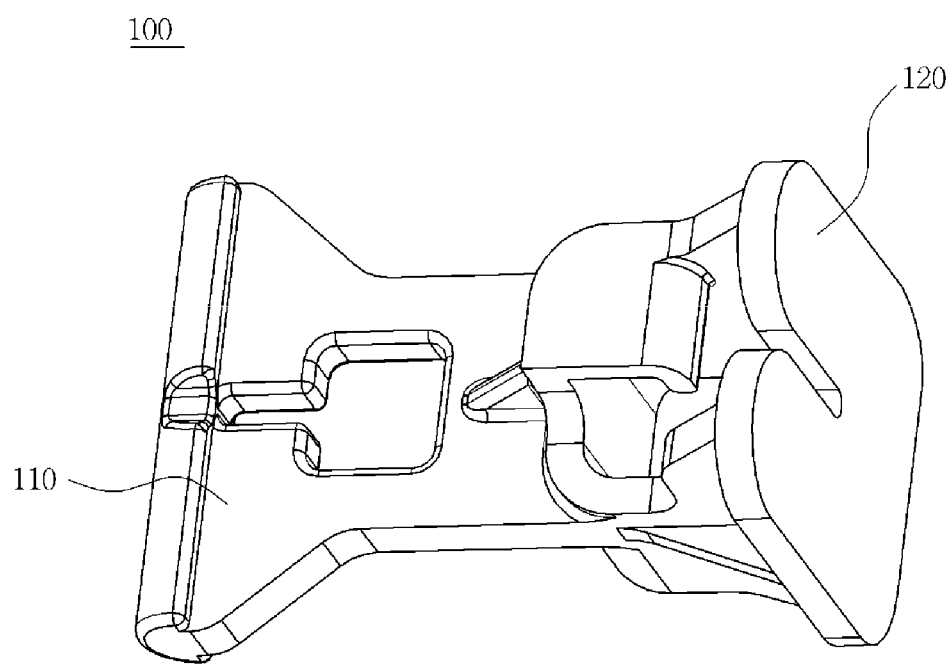
FIG. 3 is a perspective view illustrating the link lever according to the related art.

Elements that are the same as elements illustrated in FIGS. 1 and 2 are designated by the same reference numerals.

Embodiments according to the present disclosure relate to a clutch assembly 20 that intermittently operates a washing tub shaft 30, which is connected to a washing tub (not illustrated), and a pulsator shaft 40, which is connected to a pulsator (not illustrated), that moves the wash water, at a bottom surface of the washing tub. Alternatively, the pulsator shaft 40 may be replaced with an agitator shaft, which is connected to an agitator.

Embodiments according to the present disclosure relate to a link lever structure that is configured to simultaneously and intermittently operate the clutch assembly 20 and a drain valve (not illustrated) using a motor.

For example, as described with reference to FIGS. 1 and 2, one side or end of a link lever is connected to the drain valve provided in a drain assembly 10 to intermittently drain wash water, and another side (e.g., an opposite side or end) of the link lever is connected to a clutch lever 21 to intermittently operate the clutch assembly 20.

In exemplary embodiments according to the present disclosure, the clutch lever 21 is connected to a lift lever 22, and the lift lever 22 is connected to a coupling 23. In such embodiments, rotor teeth 24 are at an upper portion of the coupling 23, and fixed base teeth 25 are at a lower portion of the coupling 23. In such embodiments, the rotor teeth 24 are connected to the washing tub shaft 30, and the coupling 23 is connected to the pulsator shaft 40.

Embodiments according to the present disclosure may be applicable to implementations in which, during operation, only a first shaft is rotated, only a second shaft is rotated, or both the first and second shafts are simultaneously rotated.

For example, embodiments according to the present disclosure may be also be applicable to implementations in which, during operation, both the first and second shafts are rotated, or only the first or second shaft is rotated and the other shaft is maintained in a state of free rotation (e.g., to prevent laundry from being damaged due to collisions with the pulsator or agitator).

Figure 4:
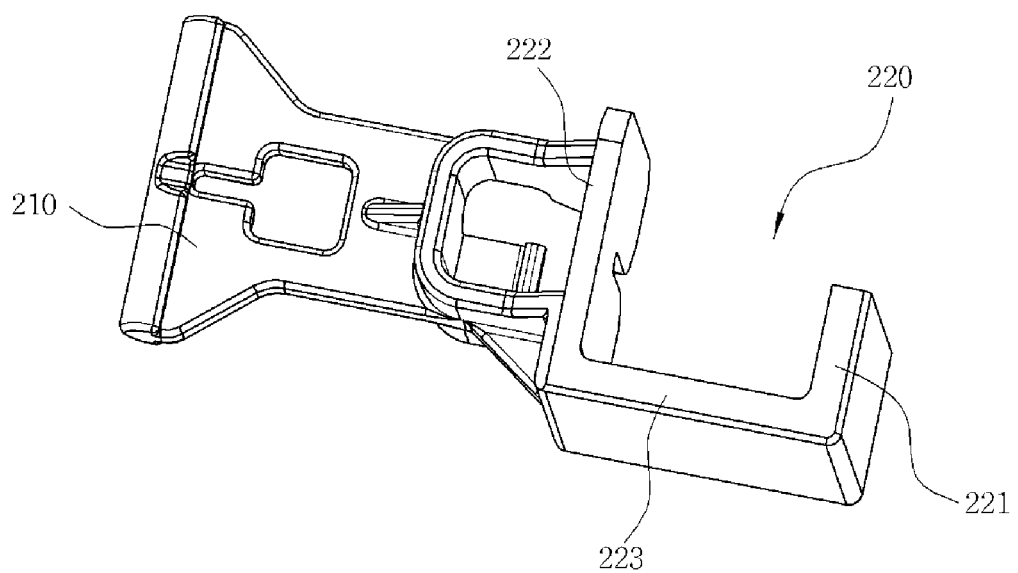
FIG. 4 is a perspective view illustrating a link lever according to a first exemplary embodiment of the present disclosure.

Accordingly, as illustrated in FIG. 4, a link lever 200 that assists operation of a clutch assembly according to one or more exemplary embodiments of the present disclosure includes a drain valve connection portion 210 and a clutch lever connection portion 220. The link lever 200 may be used in place of the link lever 100 of FIGS. 1 and 2.

The drain valve connection portion 210 is at one side/end of the link lever 200 and is connected to a drain valve in the drain assembly 10 that drains wash water from the tub. In one or more embodiments, the drain valve has a spring, and the drain valve connection portion 210 is connected to the spring of the drain valve.

The clutch lever connection portion 220 at the other side/end of the link lever 200 is connected to the clutch lever 21 of the clutch assembly 20. As illustrated in FIGS. 1 and 2, the clutch lever 21 is connected to the lift lever 22, and the lift lever 22 is connected to the coupling 23.

In embodiments according to the example of FIG. 4, the clutch lever connection portion 220 includes an outer catching portion 221 at an outer side of the clutch lever connection portion 220 (on the side opposite the drain valve connection portion 210), an inner catching portion 222 inside the outer catching portion 221 (between the outer catching portion 221 and the drain valve connection portion), and a link connection portion 223 that connects the outer catching portion 221 and the inner catching portion 222 to each other. The outer catching portion 221 may be referred to herein as the first catching portion, and the inner catching portion 222 may be referred to herein as the second catching portion.

In one or more such embodiments, the clutch lever 21 (FIGS. 1 and 2) is coupled to the link connection portion 223. For example, an end of the clutch lever 21 contacts the link connection portion 223 between the outer catching portion 221 and the inner catching portion 222, and as such is supported by the link connection portion 223. The end of the clutch lever 21 also generally contacts at least one of the outer catching portion 221 and the inner catching portion 222, and moves in a same direction as the clutch lever connection portion 220 when the clutch lever connection portion 220 moves.

The inner catching portion 222 can push the clutch lever 21 to move the clutch lever in one direction (e.g., away from the drain assembly 10 of FIGS. 1 and 2), and the outer catching portion 221 can push the clutch lever 21 to move the clutch level in another (e.g., opposite) direction (toward the drain assembly 10). Therefore, when the coupling 23 (FIGS. 1 and 2) is moved upward and downward, the coupling 23 is securely engaged with or completely released from the rotor teeth 24 at the upper side, end or portion of the coupling 23 and/or the base teeth 25 at the lower side, end or portion of the coupling 23, as previously described herein.

More specifically, when the clutch lever 21 is moved outward (away from the drain assembly 10, in the counter-clockwise direction considering the orientation of FIGS. 1 and 2), the clutch lever 21 moves against the outer catching portion 221 while the inner catching portion 222 pushes against the clutch lever 21 and applies force to the clutch lever 21 but impacts the clutch lever 21 only slightly.

On the other hand, when the clutch lever 21 is moved inward (toward the drain assembly 10, in the clockwise direction based on the orientation of FIGS. 1 and 2), the clutch lever 21 moves against the inner catching portion 222 while the outer catching portion 221 pushes against the clutch lever 21 and applies force to the clutch lever 21 but impacts the clutch lever 21 only slightly.

Consequently, when the coupling 23 is moved upward, it engages securely with the rotor teeth 24, and when the coupling 23 is moved downward it engages securely with the base teeth 25. Furthermore, when the coupling is disengaged, the coupling 23 may be sufficiently moved while overcoming the force with which it was engaged.

Moreover, in embodiments according to the present disclosure, the coupling 23 is completely moved, thereby preventing the problems described above; that is, the coupling 23 is prevented from being abraded or damaged when the coupling is engaged with the base teeth 25 after spin-drying has started (e.g., after the transition from washing to spin-drying) or when the coupling is engaged with the rotor teeth after washing has started (e.g., after the transition from spin-drying to washing).

Embodiments according to the present disclosure are not limited to the example described in conjunction with FIG. 4. The benefits just described may be obtained when the end portion of the clutch lever 21 has a different and/or more complicated shape (for example, a circular, semicircular, loop, C, U, H or other shape having opposed walls or surfaces, or a combination of such shapes, alone or with other shapes), and only a part of the end portion of the clutch lever 21 lies on the link connection portion 223 (for example, the loop fits into the outer catching portion 221).

Also, the outer catching portion 221 and the inner catching portion 222 of the clutch lever connection portion 220 may have a vertical frame shape, and the link connection portion 223 may have a horizontal frame shape. For example, the clutch lever connection portion 220 may be at substantial right angles to the outer and inner catching portions 221 and 222, and the outer and inner catching portions 221 and 222 may be substantially parallel with each other.

As illustrated in FIG. 4, when the outer catching portion 221 and the inner catching portion 222 have a vertical frame shape, the clutch lever 21 is prevented from moving away from the corresponding clutch lever connection portion 220, and the clutch lever 21 is more certain to move when the clutch lever 21 moves.

When the link connection portion 223 has a horizontal frame shape, the clutch lever 21 is more stably moved toward and away from the drain assembly 10.

The hook-like or J-shape of the clutch lever connection portion 220 (the outer catching portion 221, the inner catching portion 222, and the link connection portion 223) in the exemplary embodiment of FIG. 4 enables more secure engagement between the coupling 23 and the different sets of teeth (the rotor teeth 24 and the base teeth 25).

Next, a link lever that assists operation of a clutch assembly according to a second exemplary embodiment of the present disclosure will be described in detail with reference to the accompanying drawings.

Figure 5:
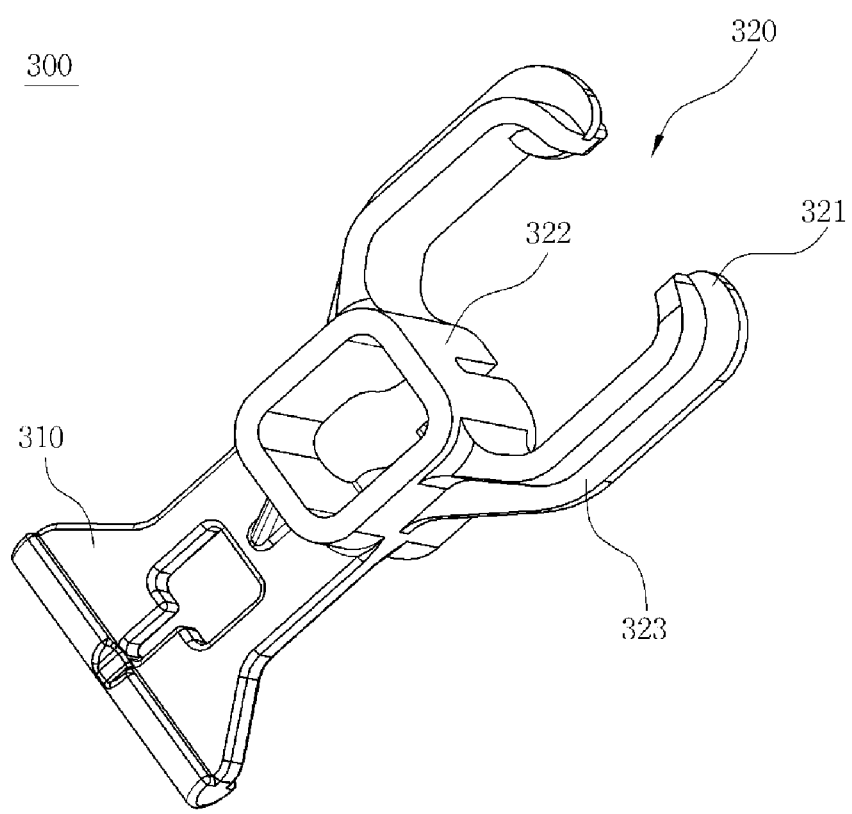
FIG. 5 is a perspective view illustrating a link lever according to a second exemplary embodiment of the present disclosure.

As illustrated in FIG. 5, a link lever 300 according to a second exemplary embodiment of the present disclosure also includes a drain valve connection portion 310 and a clutch lever connection portion 320.

Compared to the exemplary embodiment of FIG. 4, according to the second exemplary embodiment of FIG. 5, link connection portions 323 are each connected to end portions or opposed sides of an inner catching portion 322, and outer catching portions 321 are each connected to the link connection portions 323. That is, a pair of outer catching portions 321 and a pair of link connection portions 323 are provided. In other words, relative to the link lever 200 of FIG. 4, there is an additional outer catching portion and an additional link connection portion; the additional outer catching portion may be referred to herein as the third catching portion, and the additional link connection portion may be referred to herein as the second link connection portion. The outer catching portions 321, the link connection portions 323, and the inner catching portion 322 roughly form a "C" or "U" shape.

The second exemplary embodiment has the aforementioned benefits while stably coupling the clutch lever 21 to the clutch lever connection portion 320.

From the foregoing, it will be appreciated that various exemplary embodiments according to the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A washing machine comprising:
   a drain assembly;
   a clutch assembly comprising a coupling that is operable for engaging with a first set of teeth during a first washing machine operation and with a second set of teeth during a second washing machine operation;
   a clutch lever coupled to the clutch assembly and configured to move the coupling between a first position and a second position, wherein the coupling is engaged with the first set of teeth when in the first position and is engaged with the second set of teeth when in the second position; and a link lever comprising:
   a drain valve connection portion at a first end of the link lever, the drain valve connection portion configured to connect to the drain assembly; and a clutch lever connection portion configured to connect to the clutch lever;
   wherein the clutch lever connection portion comprises:
   (i) a first catching portion comprising an outer catching portion,
   (ii) a second catching portion comprising an inner catching portion, and
   (iii) a link connection portion connecting the first catching portion and the second catching portion, the first catching portion at a second end of the link lever opposite the first end, the second catching portion between the first catching portion and the drain valve connection portion, wherein when the clutch lever moves away from the drain assembly, the clutch lever initially moves against the outer catching portion while the inner catching portion pushes against the clutch lever and applies force to the clutch lever, but when the clutch lever moves toward the drain assembly, the clutch lever initially moves against the inner catching portion while the outer catching portion pushes against the clutch lever and applies force to the clutch lever.

2. The washing machine of claim 1, wherein the first catching portion and the second catching portion have a vertical frame shape, and the link connection portion has a horizontal frame shape.

3. The washing machine of claim 1, wherein the first catching portion, the second catching portion, and the link connection portion have a hook-like or J shape.

4. The washing machine of claim 1, wherein the clutch lever connection portion further comprises:
   (i) a third catching portion, and
   (ii) a second link connection portion connecting the third catching portion to the second catching portion.

5. The washing machine of claim 4, wherein the first catching portion, the second catching portion, the third catching portion, the link connection portion, and the second link connection portion have a "C" or "U" shape.

6. The washing machine of claim 1, wherein the first washing operation and the second washing operation are operations selected from the group consisting of:
   washing;
   supplying wash water;
   draining wash water;
   rinsing; and
   spin-drying.

7. The washing machine of claim 1, wherein the clutch assembly is configured to operate a washing tub shaft that is connected to a washing tub of the washing machine, and is also configured to operate a pulsator or agitator shaft that is connected to a pulsator or agitator of the washing machine.

8. The washing machine of claim 7, wherein, during washing, only the pulsator or agitator is rotated, only the washing tub is rotated, or both the pulsator or agitator and the washing tub are simultaneously rotated.

9. The washing machine of claim 7, wherein, during spin-drying, both the washing tub and the pulsator or agitator are rotated, or only the washing tub is rotated and the pulsator or agitator is maintained in a state of free rotation.

10. The washing machine of claim 1, wherein the clutch lever is coupled to or in contact with the link connection portion.

11. The washing machine of claim 1, wherein the link connection portion is at substantial right angles to the first and second catching portions, and the first catching portion and the second catching portion are substantially parallel with each other.

* * * * *